United States Patent [19]

Alexandru

[11] Patent Number: 4,604,743
[45] Date of Patent: Aug. 5, 1986

[54] BUS STRUCTURE FOR AN IMAGE PROCESSOR

[75] Inventor: Radu Alexandru, Cheshire, Conn.

[73] Assignee: North American Philips Corporation, New York, N.Y.

[21] Appl. No.: 673,960

[22] Filed: Nov. 21, 1984

[51] Int. Cl.[4] .......................... H04J 3/02; H04J 3/16; H04J 3/24
[52] U.S. Cl. ........................................ 370/85; 370/89; 370/94
[58] Field of Search ....................... 370/85, 94, 95, 86, 370/89; 340/825.5

[56] References Cited

U.S. PATENT DOCUMENTS 4,354,263 10/1982 Bordry et al. .................. 370/94
4,535,448 8/1985 Baxter et al. .................. 370/85

FOREIGN PATENT DOCUMENTS 2026818 2/1980 United Kingdom .............. 370/85

Primary Examiner—Douglas W. Olms
Assistant Examiner—Curtis Kuntz
Attorney, Agent, or Firm—Jack E. Haken; James J. Cannon, Jr.

[57] ABSTRACT

A bus structure for an image processing system connecting a plurality of devices capable of transmitting and receiving packets of N data words serially on N sub-buses wherein the data sub-buses are spatially multiplexed and an address bus is time multiplexed.

8 Claims, 5 Drawing Figures

BUS STRUCTURE FOR AN IMAGE PROCESSOR

BACKGROUND OF THE INVENTION

1. Field of the Invention

This invention pertains to the architecture of an image processing system which serves as an intelligent high performance peripheral device in a digital imaging system. More specifically, the invention pertains to a bus structure, a timing and a protocol for use in such an image processing system. The bus structure provides an interconnection in which multiple array processors and memory modules can communicate simultaneously at a maximum transfer rate for a given number of bus lines and a given clock rate.

2. Description of the Prior Art

A variety of bus structures are well known in the prior art. Bus structures for real time video processing to date have a known number of shortcomings. To keep up with the demands of video rate information transfer, a bus architecture must overcome a number of classical drawbacks. One common drawback is the inability of the bus structure to achieve maximum throughput because of the inherent time delay between initiation of a memory read cycle and the availability of valid data at the memory output. Other drawbacks are also known in the art. Occasionally very complex process arbitration is needed to satisfy conflicting demands for a bus. Furthermore, there is often dead time inherent in the write-to-read transition. Many classic designs require very fast memory which in turn increases the cost of a system. Interface structures in the prior art have become quite complex because of the timing required for data address and control signals. The architecture of the bus structure of the present invention is designed to eliminate the various transmission bottlenecks which have occurred in prior art bus designs.

SUMMARY OF THE INVENTION

The bus structure of the present invention is a portion of the architecture of an image processor. This bus structure is designed to provide an interconnection structure in which multiple array processors and memory modules can communicate simultaneously at a maximum transfer rate for a given number of bus lines and a given clock rate. In order to keep up with the demands of video rate information transfer, the architecture utilizes a dual bus system. Two sets of buses are defined. One bus is for low speed control and data transfer and the other for the video rate multiple channel image transfer. Specifically, a VME bus is used for the computer controlling functions of the imaging boards and the synchronous video bus is designed to support D data channels where each channel has a B bit path.

The requirements of digital imaging applications for simultaneous processing lead to a parallel processing architecture in the central processor. In the image processing module this is achieved by way of the bus structure having multiple data paths and timing synchronization and high speed special purpose processors.

The video bus is further decomposed into four functional buses: address selection, data buses, timing and synchronization, utility and control. This particular choice of buses in divisions of activities removes the potential bottlenecks and provides simultaneous image transfer at video rates.

Generally, a bus structure can be made up of D data lines (the data bus) and A address lines (the address bus) as required for each application and a number of timing and control lines. A typical implementation of this structure consists of a 128 line data bus, a 28 line address bus, 2 timing clocks, 19 video control signals and 34 collision protection signals. To achieve maximum throughput and avoid the inherent time delay between initiation of a memory read cycle and the availability of valid data at the memory output, the bus structure of the present invention has the following features.

The data bus is divided into N sub-buses. This permits the dynamic allocation under software control of an independent path for each process, from 1 to N processes. Therefore, process arbitration is not needed. Each process can be allocated to one or several data sub-buses as required to match its specific data throughput requirements. This allocation constitutes a spatial multiplexing of the data sub-buses among N processes. The processes which perform both memory read and memory write operations are allocated to separate read and write buses, thus eliminating the dead time inherent in a read-to-write transition.

The addresses of all data sub-buses are time multiplexed on the address bus. Each data sub-bus address is transferred during a different clock time (time slot). Typically, the address receiver, usually a memory board, latches the address at the end of the time slot. This concept minimizes the number of lines needed to address data for all of the N data sub-buses. Each address accesses N words, which are transferred serially, one word per clock cycle, on the corresponding data sub-bus. The N words accessed with one address are called a packet. Utilizing this packet design, it takes the same amount of time, N clock cycles, to transfer all data packets as it takes to address all N data buses. This enables full time use of both the address and the data lines with no dead time. Furthermore, the time, N clock cycles, to access each memory module is increased. This permits the use of slower, less expensive memories and/or increased performance via multiple accesses to the memory, multiporting, during a packet time.

The bus structure of the present invention provides an optimum design in that it achieves the maximum possible throughput for array transfers for a given number of lines and a given clock rate. Up to N simultaneous data transfers, read or write, can be performed without the need for data or address arbitration. The number of read and write transfers is optimized in N steps to suit a particular application. Data can be fetched and returned to memory in parallel on different sub-buses without the need for local memory. This provides the optimum data path structure for pipeline processors. Data bus lines D can be subdivided into various word sizes in D/N increments. The multiple buses in the packet oriented timing are particularly suitable for array processing. Multiple array data can be transferred simultaneously and synchronously in their natural serial format.

The interfacing to the bus is relatively simple. The timing is fully synchronous for data, address and control signals. Data buses and address time slots are allocated by the system software, thereby eliminating the need for a request/arbitration/grant cycle. The timing of data transfers is fixed with respect to each packet clock, thereby eliminating the need for an acknowledge phase.

DESCRIPTION OF THE PREFERRED EMBODIMENT

Figure 1:
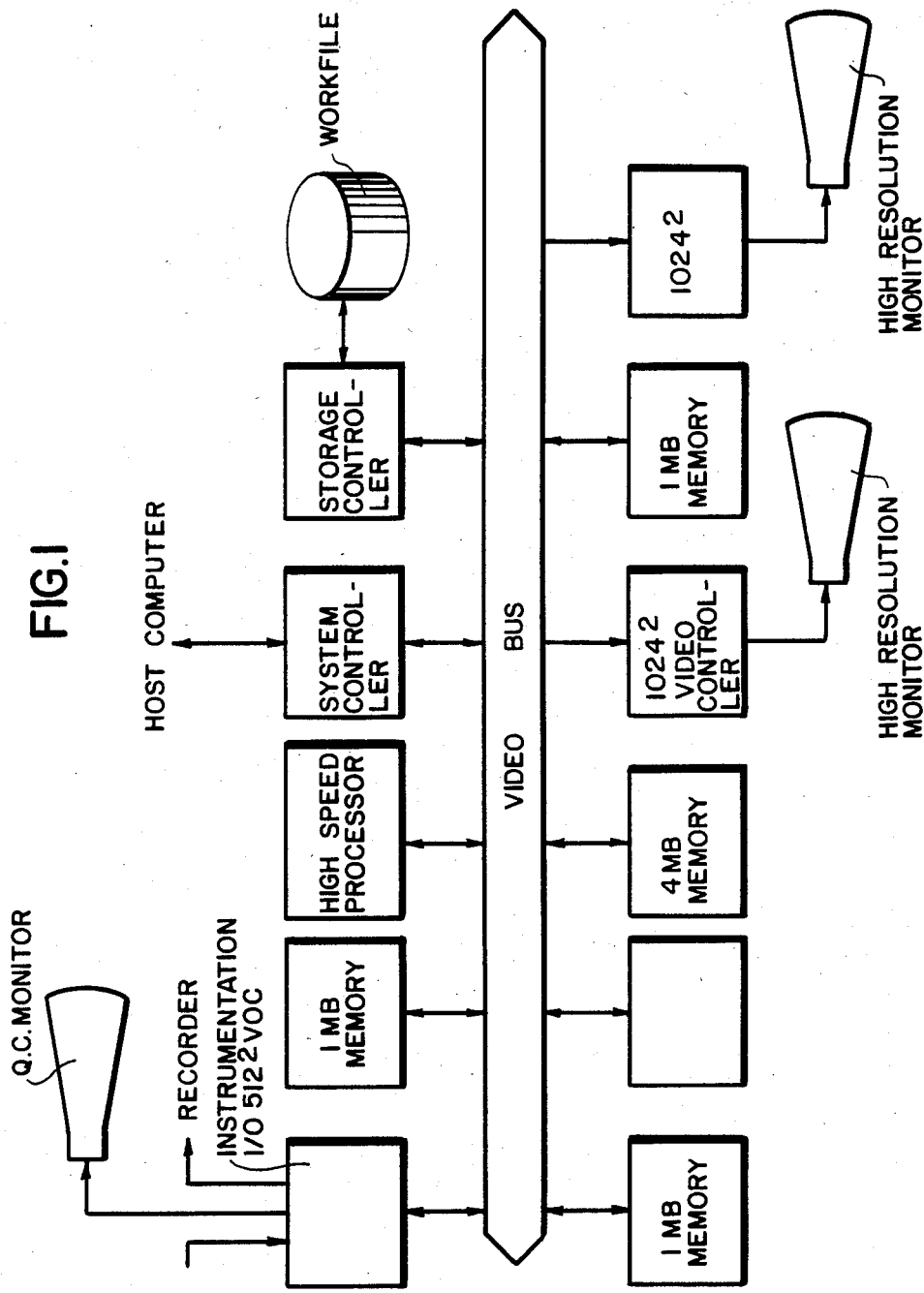
FIG. 1 is a block diagram of a digital imaging system showing a context in which the video bus of the present invention may be used.

The bus structure of the present invention, designed for an image processing system, provides for rapid processing of images. A typical application is a medical imaging system in which data acquisition, immediate processing and later post-processing of data from a variety of devices such as CAT scanners, NMR's, radiographic and fluoroscopic instruments is required. FIG. 1 is a block diagram illustrating the utilization of the bus of the present invention in such a system, in which large arrays of data must pass through various hardware modules very quickly, up to a video rate. The structure of the present invention is a uniform, nondedicated, bidirectional bus system.

In the description of the preferred embodiment which follows, a relatively moderate transfer clock frequency is fixed at 9 MHz. A very wide data path does not lend itself to a good utilization in applications such as those considered for image processing. Instead of manipulating very large numbers, the bus of the present invention works with multiple, relatively narrow data organized in arrays upon which repetitive operations are to be performed. To do this efficiently, the data path has been partitioned into 16 eight-bit video data sub-buses, each of which may be driven by a different module. The data are transferred serially on these buses, which corresponds to the natural array structure of the image. Hence, for the preferred embodiment discussed herein the data bus is divided into N data sub-buses, where N equals 16, and the data bus itself is 128 lines.

An image processing module must support multiple asynchronous simultaneous processes. This means that multiple independent process masters should be able to control the movement of different data streams at the same time. The bus is designed to allow a maximum of 16 simultaneous video processes, each of which is able to transfer data on at least one video data sub-bus. This constitutes a spatial multiplexing of the video data sub-buses. Since it is impractical to implement 16 address buses, one for each possible process, the architecture of this system uses a time multiplexed video address bus, having 24 lines in the preferred embodiment.

In order to fully utilize the throughput of the data path, each video address accesses a 16 pixel packet. This is also convenient for memory design. Although each 16 pixel data transfer takes 16 clock cycles, an address is asserted during only 1 clock cycle. Therefore, 16 pixels of data on each video data bus can be transferred with all 16 possible process masters having asserted their respective video addresses. In the system of the present invention, no bus arbitration is necessary because the throughput of the address bus exactly matches that of the data buses. The various process masters are assigned fixed time slots during which to assert the video addresses. A video data bus which is initialized for a read or write operation at the beginning of a process will perform the same operation repeatedly, until a whole array is transferred. The only dynamic control is on writing individual words in the packet. This is done by means of 16 write enable lines, one for each data bus, on which write enable mask signals are transferred serially with each word. This allows conditional updating of only certain words in an array. In this image processing system, the memory consists of storage arrays, each of which can be simultaneously accessed through multiple channels. Therefore, in a memory access both the address in the array and the access channel must be specified. The same memory address can be simultaneously accessed by several processes through different channels.

DETAIL DESIGN

The detailed design of the bus structure of the present invention is presented herewith. This section describes a typical implementation of the preferred embodiment, with D=128, N=16, and A=24.

SIGNALS

The data bus consists of the following groups of signals:
- video data buses (16) [VDAT]
- video address bus [VADD]
- video control signals [VCHNO, VADDVAL, WE]
- timing signals [SYSCK, PACKETCK]
- collision protection signals [GINVD, GOUTVD, GINVADD, GNOUTVADD]

VIDEO DATA BUSES

Typically, data is transferred via 16 8-bit video data buses:

VDAT0-0* . . . VDAT0-7* Video data bus 0, bit 0 to 7

VDAT15-0* . . . VDAT15-7* Video data bus 15, bits 0 to 7

The signals are TTL negative-true.

VIDEO ADDRESS BUS

Transfer addresses are asserted by process masters on the video address bus:

VADD4* . . . VADD27*

There are 24 video address lines. They represent the most significant bits of the 28-bit address space. The least significant four bits are not physically implemented because each video address accesses not a word but a 16-word packet. The numeration of the video address lines starting from 4 instead of 0 emphasizes this fact.

The signals are TTL, negative-true.

| VIDEO CONTROL BUS | |
|---|---|
| VIDEO CHANNEL NUMBER | |
| VCHNO 0* | Video channel number lines. |
| VCHNO 1* | Together with the address they define the memory board and the channel to which a particular video access request was addressed. |
| VADDVAL* | Video address valid, asserted by transfer masters during the time slots when they issue an address. |

-continued

| VIDEO CONTROL BUS | |
|---|---|
| VIDEO CHANNEL NUMBER | |
| WE0* ... WE15* | Word write enable, one for each data bus. Defines which words transferred on the bus are to be stored (written) in the memory. The write enable signals are transferred serially, in parallel with the corresponding data words. |
| VCON 0* ... VCON 1* | Reserved for future control functions (such as expansion of channels/board). |

TIMING SIGNALS

The data bus is synchronous. All signal changes occur after the leading edge of the system clock and are guaranteed to reach the new state 10 ns before the next leading edge of the system clock is received.

The other timing characteristic of the data bus is the packet organization. All the events are referenced to a "packet clock", occurring every 16th clock cycle.

The timing signals associated with the VIDEO BUS are:

| SYSCK* | System clock: Has a frequency of 9.072 MHz for 60 Hz systems and 9.000 MHz for 50 Hz systems. It is an ECL signal distributed via a 50-Ohm line terminated at both ends of the line. |
|---|---|
| PACKETCK* | Packet clock: TTL negative true signal generated once every 16 SYSCK* pulses. |

Figure 2:
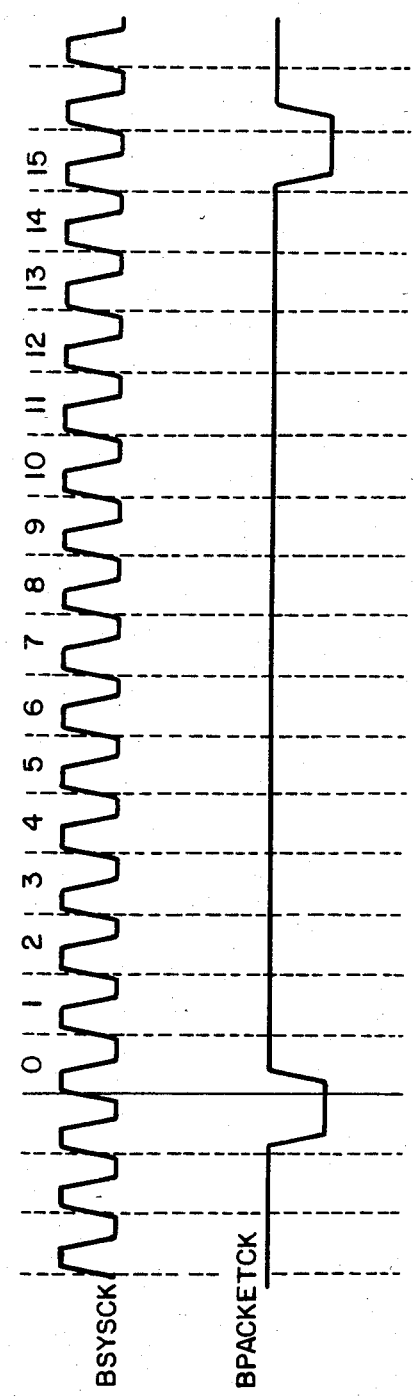
FIG. 2 illustrates the timing relationship between the system clock and the packet clock of the present invention.

The relationship between SYSCK* and PACKETCK* is shown in FIG. 2.

COLLISION PROTECTION MECHANISM

Because of the complex multi-bus, multi-master, simultaneous processing, the danger exists that because of an error, two devices will simultaneously try to access the same bus. To handle such a situation, a collision protection mechanism is used. It consists of 17 daisy-chained signals (one for each video data bus and one for the video address bus).

When a board wants to drive a bus, it asserts an Output Request Signal to the on-board collision protection circuit one clock-time before the actual transfer. This will drive the "Grant Out" signal high, inhibiting all the boards with lower priority from driving the bus. If the "Grant In" signal is low, then in the next clock cycle the output drivers will be enabled. If "Grant In" is high, then the output will not be enabled and "Grant Out" will be high.

The signals used for collision protection are:

| GINVD0* ... GINVD15* | Grant In for video data lines 0 ... 15 |
|---|---|
| GOUTVD0* ... GOUTVD15* | Grant Out for video data lines 0 ... 15 |
| GINVADD* | Grant In for video address |
| GOUTVADD* | Grant Out for video address |

TIMING AND PROTOCOL

Timing of the data bus is governed by 2 periodical signals, the system clock and the packet clock. The duration of a system clock period is also called a time slot. For ease of referencing, the time slots (between 2 packet clocks) are labeled from 0 to 15 (FIG. 2). This is an arbitrary notation without any special significance regarding the address or data packets. The important factor is that the address, write data, and read data packets have a fixed timing with respect to the packet clock.

Figure 3:
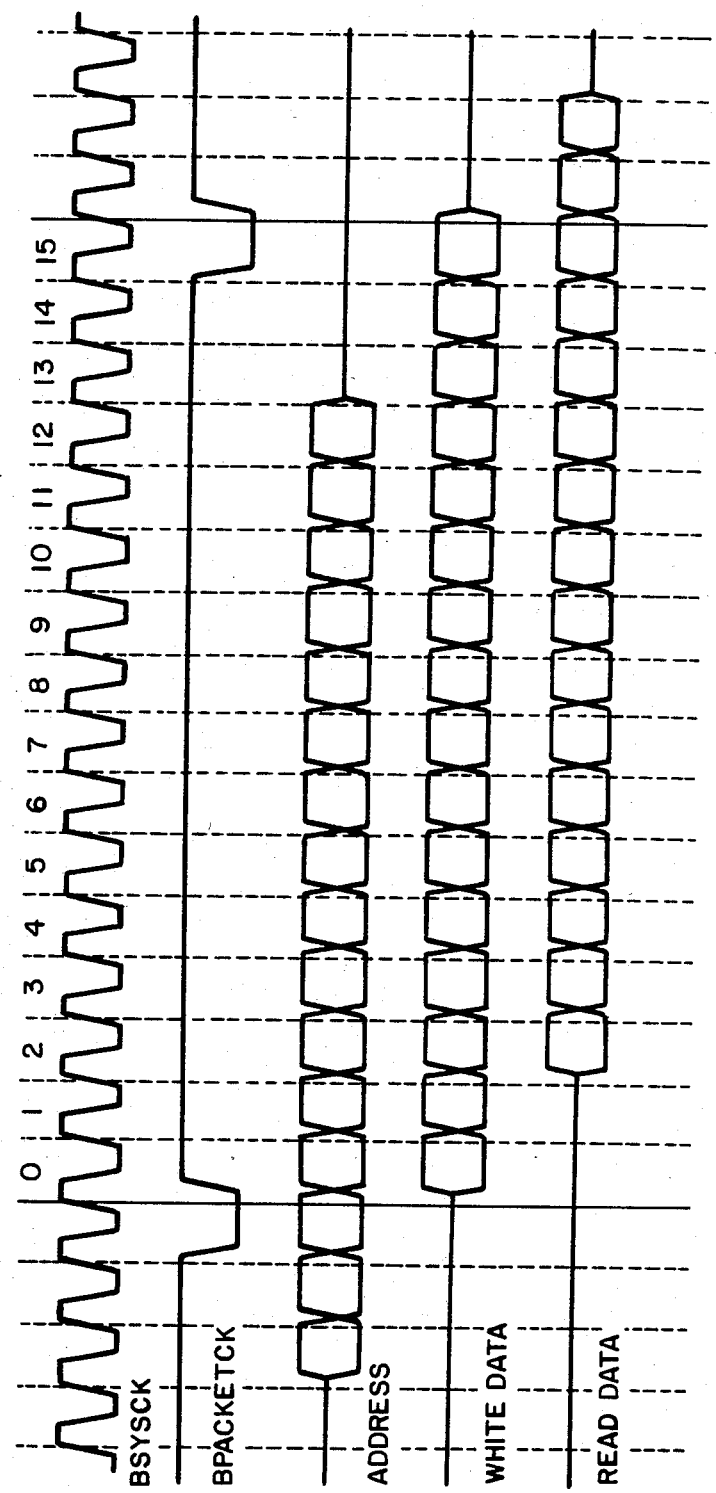
FIG. 3 shows the phase of various signal packets with respect to the buffered packet clock.

The address packet starts 2 time slots before the (buffered) packet clock. The write data packet starts one time slot after the buffered packet clock. The read data packet starts 3 time slots after the buffered packet clock. This is illustrated in FIG. 3.

The data buses and address time slots are dynamically allocated before the transfer by the system software.

Figure 4:
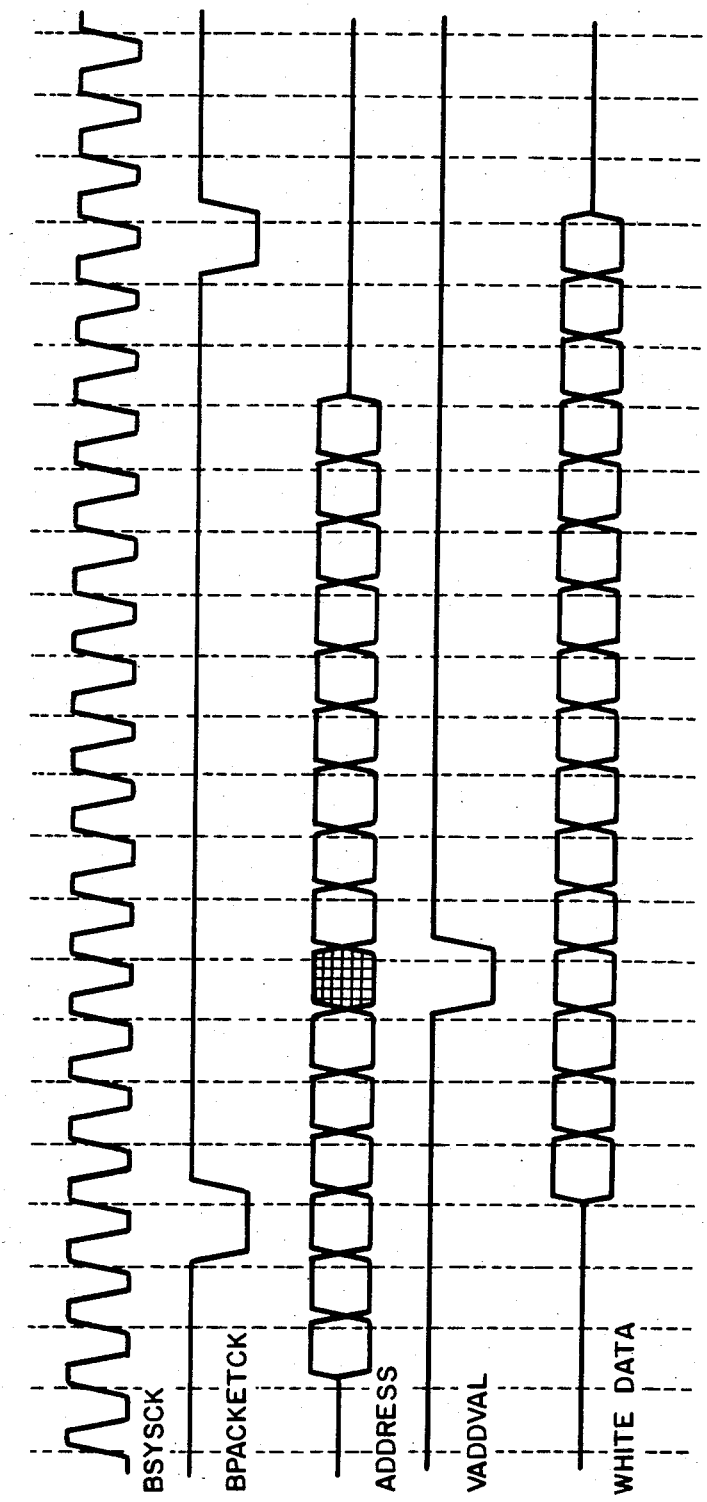
FIG. 4 illustrates the write transfer timing in the present invention.

The timing of a write transfer (FIG. 4) is as follows:

The master monitors the packet clock and determines the start of an address packet. Then three system clock cycles later, it starts shifting out the data and "write enable" signals to the allocated bus(es). At the same time, the master waits for the allocated time slot(s), at which time it outputs the address(es), one clock period per address. This is the whole write transfer protocol. The unusual characteristic of it is the timing of address assertions which is decoupled from the start of data transfer; in fact, the address can be asserted after the data starts being transferred, as opposed to all "classic" buses where the sequence of arbitration/address/data/acknowledge is mandatory. At the receiving units, this data is latched whether it is to be used or not. The data enters a shift register (or other buffer device) where it is retained until the destination address arrives. Then the receiving device makes its decision to use or discard the data in the shift register buffer. This decision is made before the end of the packet transfer. While this aspect may be confusing for the first time user of the bus, the actual implementation of the protocol is simpler than that for the "classic" buses; this is because of the fixed, synchronous nature of the bus and because of the lack of arbitration and acknowledge phases of the transfer cycle.

Figure 5:
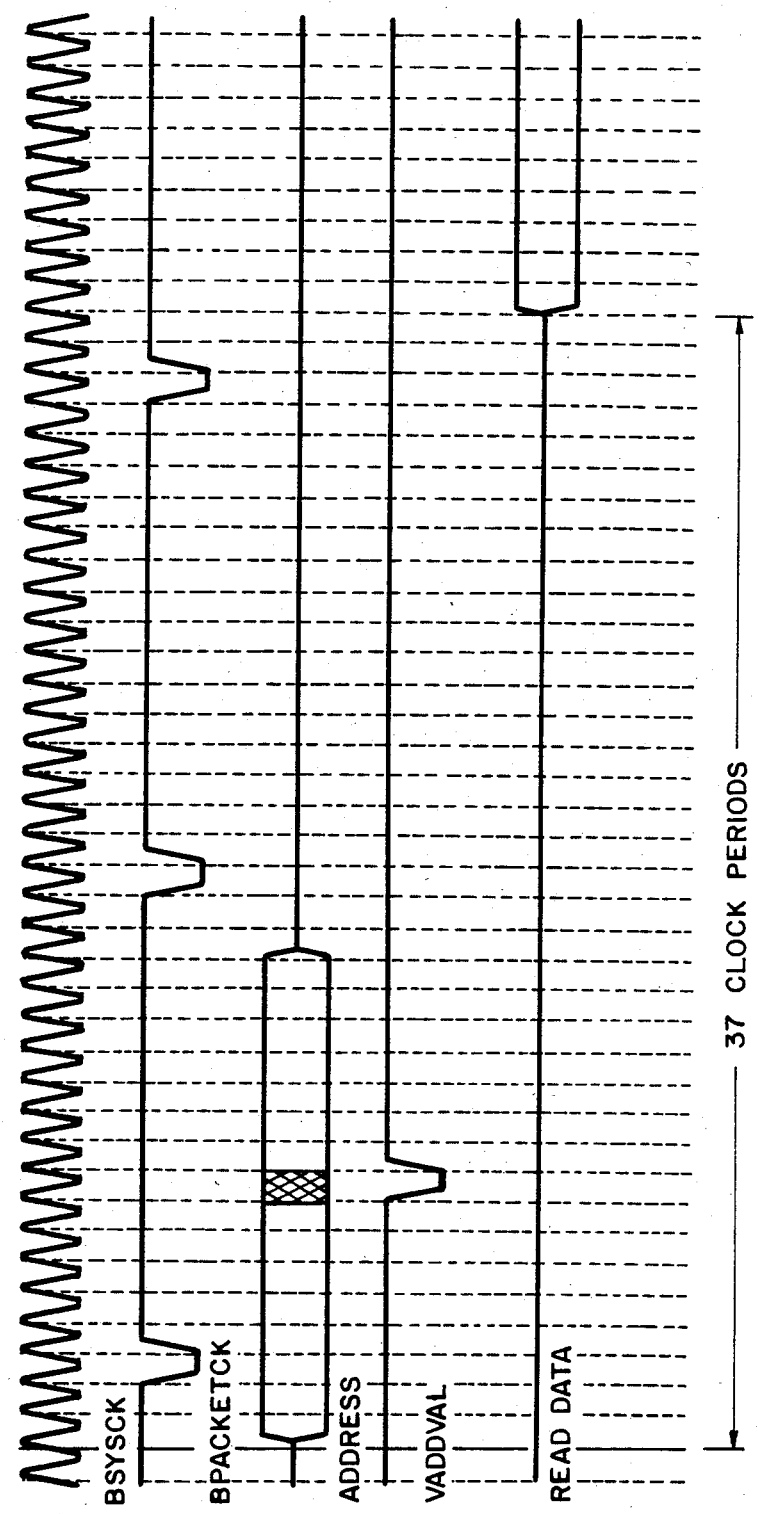
FIG. 5 illustrates a read transfer timing in the present invention.

The only difference between the read transfer (FIG. 5) and the write transfer is in the time of data transfer. In this case, since the data comes from a slave device (usually the memory), the address has to be asserted first and enough time has to be allowed for the data to be accessed in the pipelined memory. Here again, the start of the data packet is fixed not with respect to the time slot in which the address was asserted, but with respect to the start of the address packet. Namely, if the address is asserted during the address packet which starts at clock 0, the data starts coming at clock 37 (or 2 address packets and 5 clocks later).

As can be seen from the foregoing discussion, the data bus is divided into N sub-buses. This permits an independent path to be allocated for each process, from 1 to N processes. No process arbitration is needed. Each process may be allocated to one or several sub-buses as required to match its specific data throughput requirements. Thus, the data bus is spatially multiplexed. Processes which perform both memory read and memory write may be allocated to separate read and write buses, eliminated the dead time inherent in a right-to-read transition.

The addresses of all data sub-buses are time multiplexed on the address bus. Each sub-bus address is transferred during a different clock cycle, time slot. Typically, the address receiver latches the address at the end of the time slot. This minimizes the number of lines needed to address data for all of the N sub-buses.

Each address accesses N words, which are transferred serially one word per clock cycle on the corresponding data sub-bus. The N words accessed with one address are called a packet. It takes the same amount of time, N clock cycles, to transfer all data packets as it takes to address all N data buses. This enables full-time use of both the address and the data lines with no dead times.

The design of the bus structure of the present invention is optimum in the sense that it achieves the maximum possible throughput for a given number of lines and a given clock rate. Up to N simultaneous data transfers can be performed without the need for data or address arbitration. The number of read/write transfers can be optimized in N steps. Data can be fetched and returned to memory in parallel on different sub-buses without the need for local memory. Data bus lines can be judicially subdivided into various word sizes in D/N increments. The multiple sub-buses and the packet-oriented timing are particularly suitable for array processing. Multiple array data can be transferred simultaneously and synchronously in their natural serial format. Interfacing to the bus is simple because the timing is synchronous for data address and control signals. The data sub-buses are dynamically allocated by the system software and data transfer timing is fixed, thereby simplifying protocols.

I claim:

1. An image processing system, capable of sustaining N simultaneous processes, comprising:
   a plurality of data acquisition, data processing, storage, and/or display devices;
   a synchronous video bus interconnecting all of said devices for communicating digital image information therebetween at video data rates;
   a low speed bus interconnecting said devices for communicating control information therebetween;
   said video bus comprising a time-multiplexed address selection bus, a timing and synchronization bus, and a plurality of N dynamically allocatable data sub-buses;
   said address selection bus and each of said data sub-buses comprising a plurality of parallel data lines;
   system clock means for producing a periodic signal on the clock bus which defines sequential time slots;
   packet clock means for producing a periodic signal on the clock bus which defines sequential packet slots, each of said packet slots comprising at least N time slots and being synchronized therewith;
   each of said devices comprising means for transmitting and/or receiving a packet of N serial words of data on each of one or more allocated sub-buses during each packet slot and in synchronization with said time slots;
   each of said devices further comprising means for transmitting and/or receiving a single word of address information during a single allocated time slot in each packet which time slot is uniquely allocated with the data sub-bus allocated to the device;
   whereby said sub-buses are spatially multiplexed among said processes and said address bus is time multiplexed among said processes.

2. The system of claim 1 wherein each device capable of receiving data on a sub-bus further comprises a buffer for storing data from said bus during the time slots which occur during the packet slot prior to the time slot in which address information is transmitted for said device.

3. The system of claim 1 in which said D data lines can be subdivided into various words in N increments.

4. The system of claim 1 wherein where there are D/N data buses and the number of processes which can utilize said bus ranges from 1 to N.

5. The system of claim 1 wherein the length of a packet P is N words for N sub-buses of D/N data lines each.

6. A bus structure providing an interconnecting transfer link between multiple array processors and memory modules in a digital imaging system comprising:
   D data lines for the transfer of data, said data lines constituting a data bus;
   A address lines for addressing data in said memory modules;
   V video control lines for video control signals;
   C collision protection lines for collision protection signals;
   a system clock defining time slots for timing system operations;
   a packet clock defining multiple time slots for data transfer;
   said data bus being divided into N sub-buses, each sub-bus having D/N data lines;
   means to allocate said sub-buses to from 1 to N processes, such that each process has an independent data path having one or more sub-buses, depending on the throughput requirements of the process;
   means to time-multiplex the addresses of said data sub-buses on said address bus such that each sub-bus address is transferred during a different clock cycle;
   each of said addresses accessing N words which are transferred serially, one word per clock cycle on the allocated data sub-bus;
   said N words accessed by one address being a data packet;
   such that in N clock cycles said bus can transfer N addresses and N data packets, thus having no unused time on said data lines and said address lines.

7. A bus structure for use in a digital imaging system comprising:
   D data lines forming a data bus for the transfer of data from one system module to other system modules;
   A address lines forming an address bus for addressing data;
   a system clock for timing bus operations;
   a packet clock for timing the serial transfer of packets of data over said data bus;
   a plurality of video control signals transferred over video lines of said bus;
   a plurality of collision protection signals transferred over control lines of said bus;
   means to divide said data bus into N data sub-buses;
   means to allocate from 1 to N of said data sub-buses to from 1 to N processes, such that said data bus is fully utilized when N of said processes are operational;
   means to allocate read and write processes to separate read and write data sub-buses;
   means to time-multiplex addresses of said data sub-buses on said address bus, by transferring each of said addresses during a different clock cycle of said system clock;

each of said addresses accessing N data words, which data words are transferred serially at a rate of one word per system clock cycle on the corresponding data sub-bus;
said N words accessed by one address being a packet; and
N packets being transferred in the same N system clock cycles during which N data buses are addressed.

8. The bus structure of claim 7 wherein the means to allocate sub-buses and processes is under control of software.

* * * * *